US005084805A

United States Patent [19]

Goto

[11] Patent Number: 5,084,805

[45] Date of Patent: Jan. 28, 1992

[54] VEHICULAR LAMP HAVING A LIGHT SHIELDING LAYER

[75] Inventor: Yoshimasa Goto, Shizuoka, Japan

[73] Assignee: Koito Manufacturing Co., Ltd., Tokyo, Japan

[21] Appl. No.: 704,234

[22] Filed: May 22, 1991

[30] Foreign Application Priority Data

May 30, 1990 [JP] Japan ................................ 2-138402

[51] Int. Cl.5 ................................................ B60Q 1/00

[52] U.S. Cl. ...................................................... 362/61

[58] Field of Search ........................................... 362/61

[56] References Cited

U.S. PATENT DOCUMENTS 4,849,861 7/1989 Arima .................................. 362/61

*Primary Examiner*—Carroll B. Dority
*Attorney, Agent, or Firm*—Sughrue, Mion, Zinn, Macpeak & Seas

[57] ABSTRACT

A horizontal plate-like shade extends forward from a lamp body to separate two adjacent lamp chambers. An inner lens extending over the two lamp chambers has an engaging part including a horizontal back-side recess strip being engaged with or attached to the front end of the shade and a horizontal front-side protrusion strip being engaged with or attached to an outer lens. A light shielding layer is formed on the back-side recess strip and/or the front-side protrusion strip.

11 Claims, 5 Drawing Sheets

VEHICULAR LAMP HAVING A LIGHT SHIELDING LAYER

BACKGROUND OF THE INVENTION

The present invention relates to a lamp installed on a vehicle (hereinafter referred to merely as "vehicular lamp", when applicable) and, more particularly, relates to a vehicular lamp in which a shade extending from a lamp body separates a plurality of lamp chambers adjacent to each other.

A conventional vehicular lamp of this type is as shown in FIG. 7. That is, the vehicular lamp includes a lamp body 2, and a shade 4 for separating two lamp chambers Sa and Sb adjacent to each other (for instance, a tail and stop lamp chamber Sa and a turn signal lamp chamber Sb). Both of the lamp chambers Sa and Sb are covered with an inner lens 6. More specifically, the inner lens 6 has a protrusion strip 7, which is engaged with a recess 5 formed at the front end part of the shade 4. An outer lens 8 is provided in front of the inner lens 6.

In the conventional vehicular lamp thus constructed, to separate light beams emanating from the adjacent lamp chambers Sa and Sb (i.e., to separate light emitting regions of the outer lens 8 for the respective lamps) and to facilitate formation of the lamp body, the shade 4 is formed so as to have a dual wall construction and the width d of the recess 5 in the front end part of the shade 4 is made relatively large, with a result that the lamp chambers Sa and Sb are reduced in volume as much. Because of this construction, the conventional vehicular lamp suffers from the following problems. The lamp body 2 is liable to be deformed by heat from the bulbs 9, and the freedom in selecting a synthetic resin material to be used as the lamp body is limited from the viewpoint of heat resistance.

SUMMARY OF THE INVENTION

The present invention has been made in view of the foregoing problems of the prior art. An object of the invention is, therefore, to provide a vehicular lamp in which a shade extending from a lamp body separates a plurality of lamp chambers adjacent to each other, an inner lens extends to cover the adjacent lamp chambers, and each of the lamp chambers is larger in volume.

The foregoing object of the invention has been achieved by the provision of a vehicular lamp in which a shade extending from a lamp body separates a plurality of lamp chambers, an inner lens is provided that is engaged with (or attached to) the front end of the shade and is laid over the plurality of lamp chambers, and an outer lens is provided in front of the inner lens, and in which, according to the invention, the shade has a horizontal plate in its front part, the inner lens has, on its back side, a horizontal recess strip to be engaged with (or attached to) the horizontal plate of the shade, and a light shielding layer is formed on the front side and/or the back side of the region of the inner lens where the recess strip is formed.

The light shielding layer formed in the region of the inner lens where the recess strip is formed prevents light beams from the lamp chambers from passing through the region to advance forward, thus providing a non-light-emissive region between outer lens light emission regions which correspond to the respective lamp chambers adjacent to each other.

DESCRIPTION OF THE PREFERRED EMBODIMENTS

Embodiments of the present invention will be described with reference to the accompanying drawings.

Figure 1:
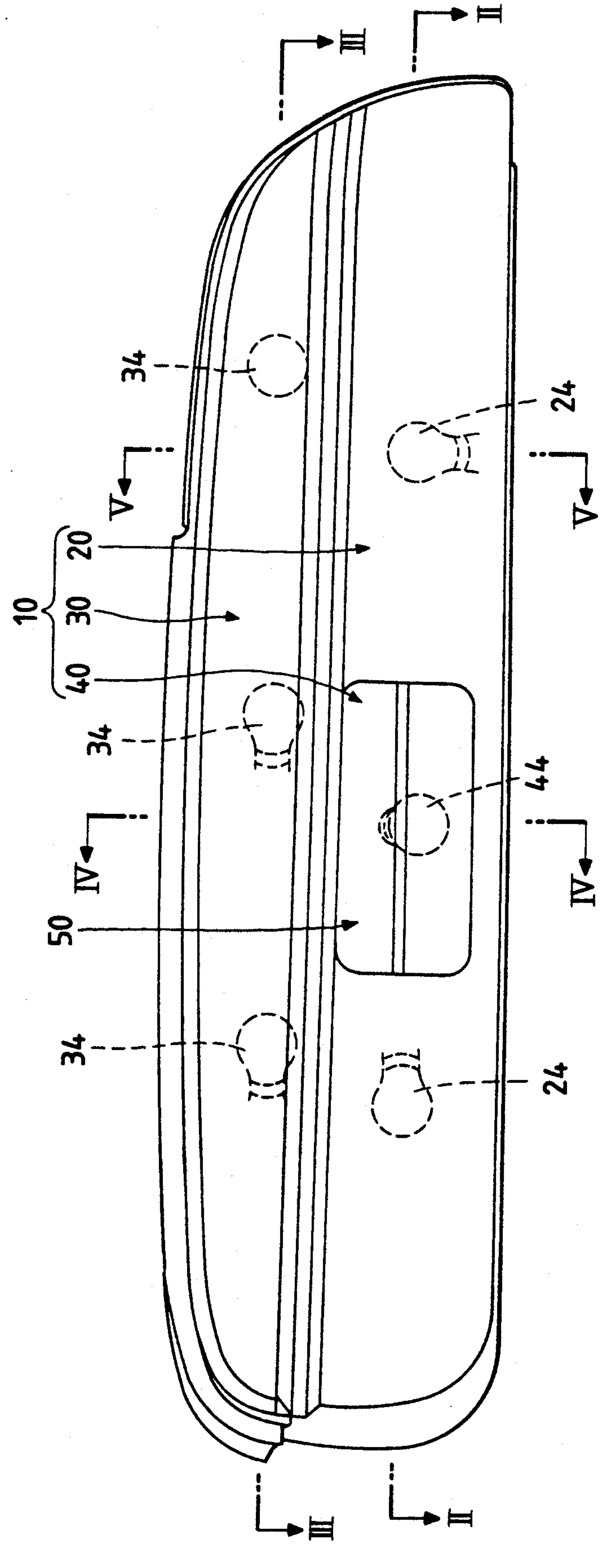
FIG. 1 is a front view of a rear combination lamp including, as one unit, a tail and stop lamp and a turn signal lamp, which is a first embodiment of the present invention.
Figure 2:
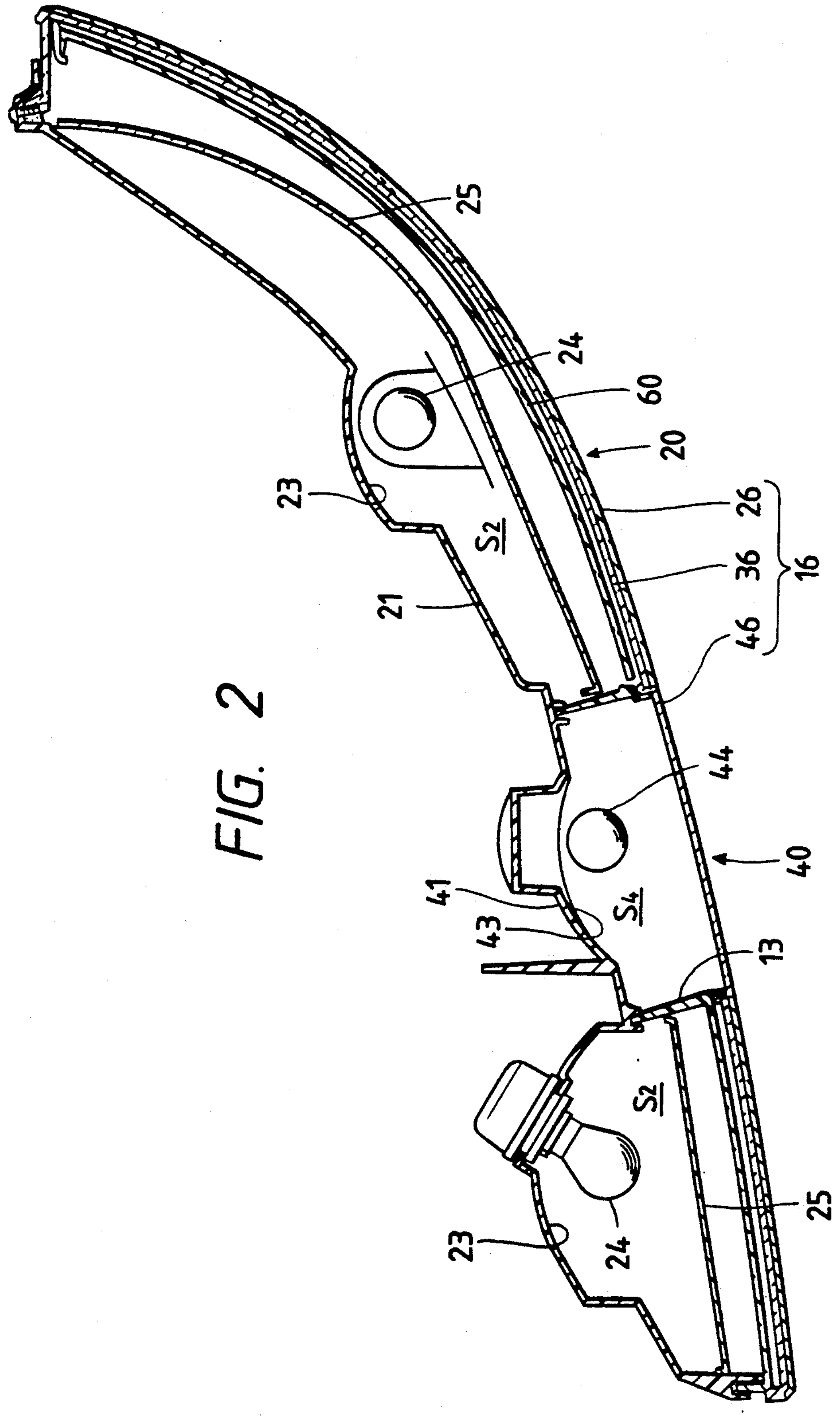
FIG. 2 is a horizontal sectional view taken along line II—II in FIG. 1.
Figure 3:
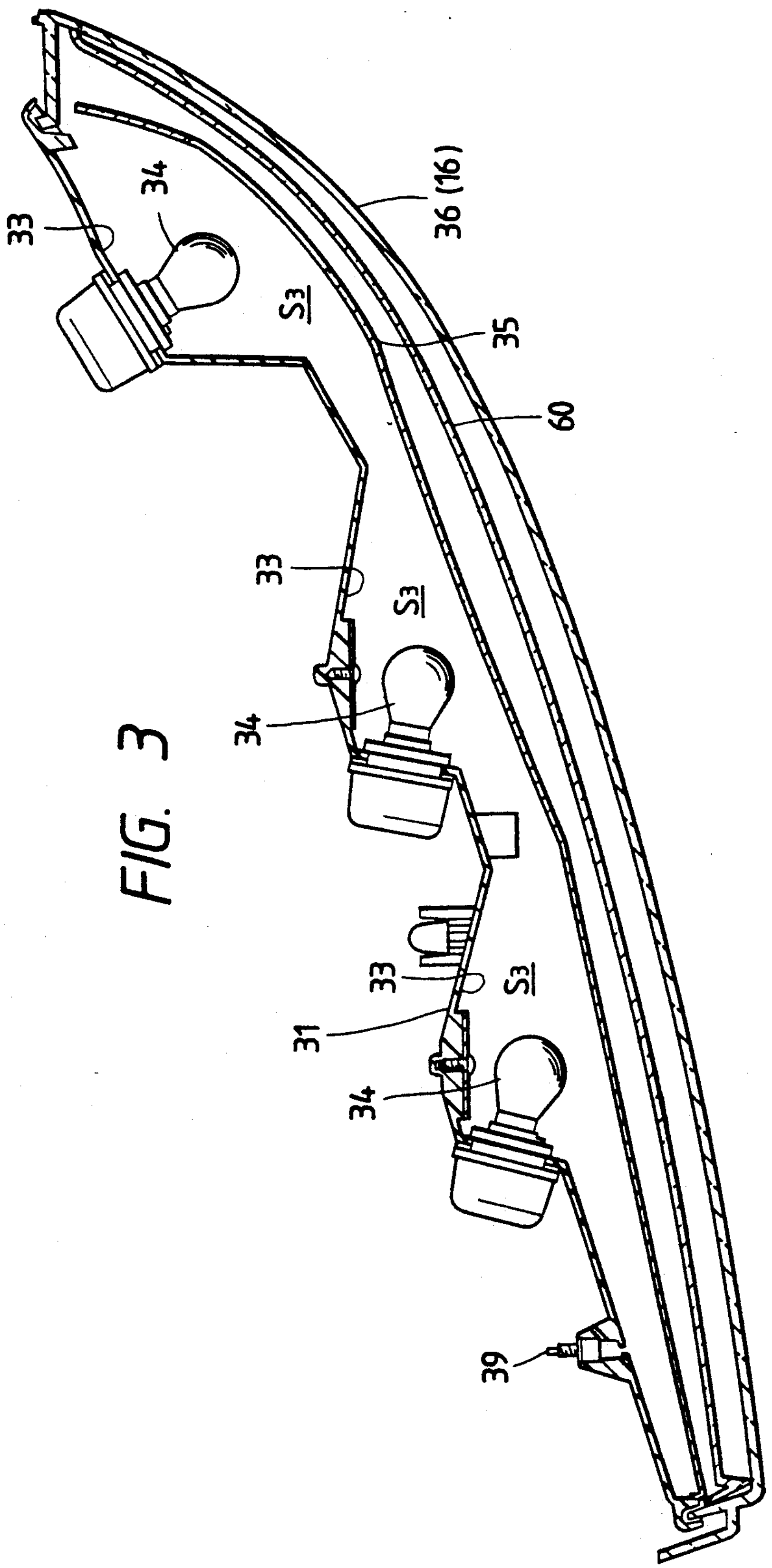
FIG. 3 is a horizontal sectional view taken along line III—III in FIG. 1.
Figure 5:
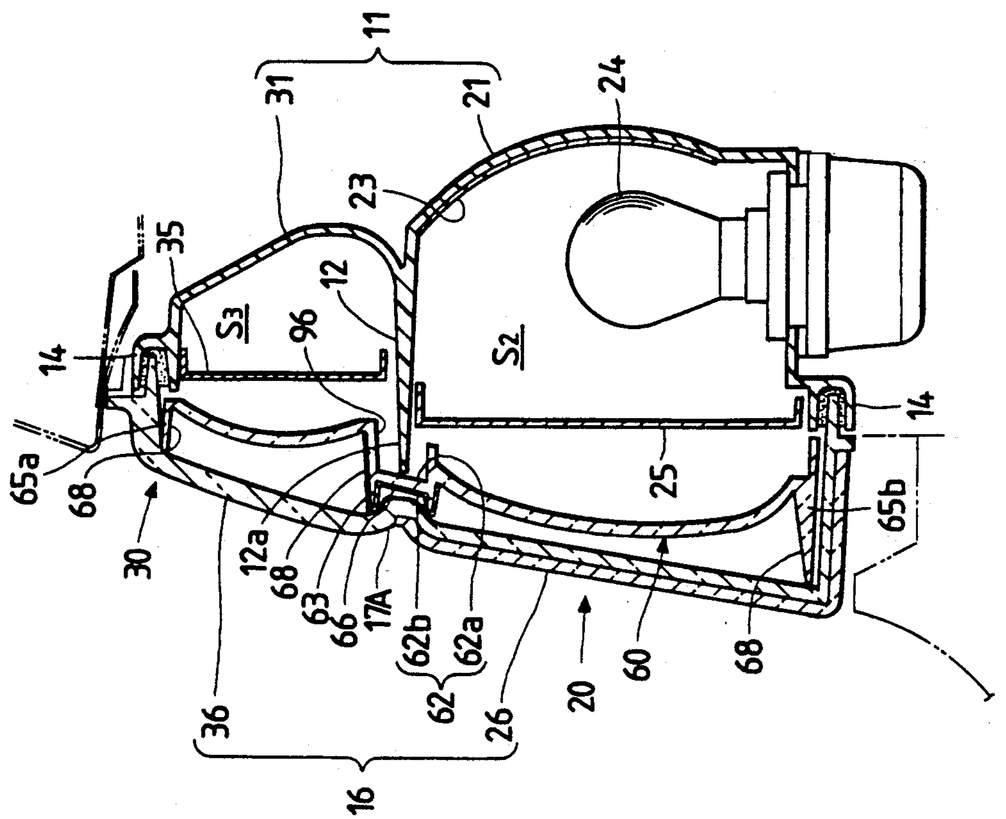
FIG. 5 is a vertical sectional view taken along line V—V in FIG. 1.
Figure 4:
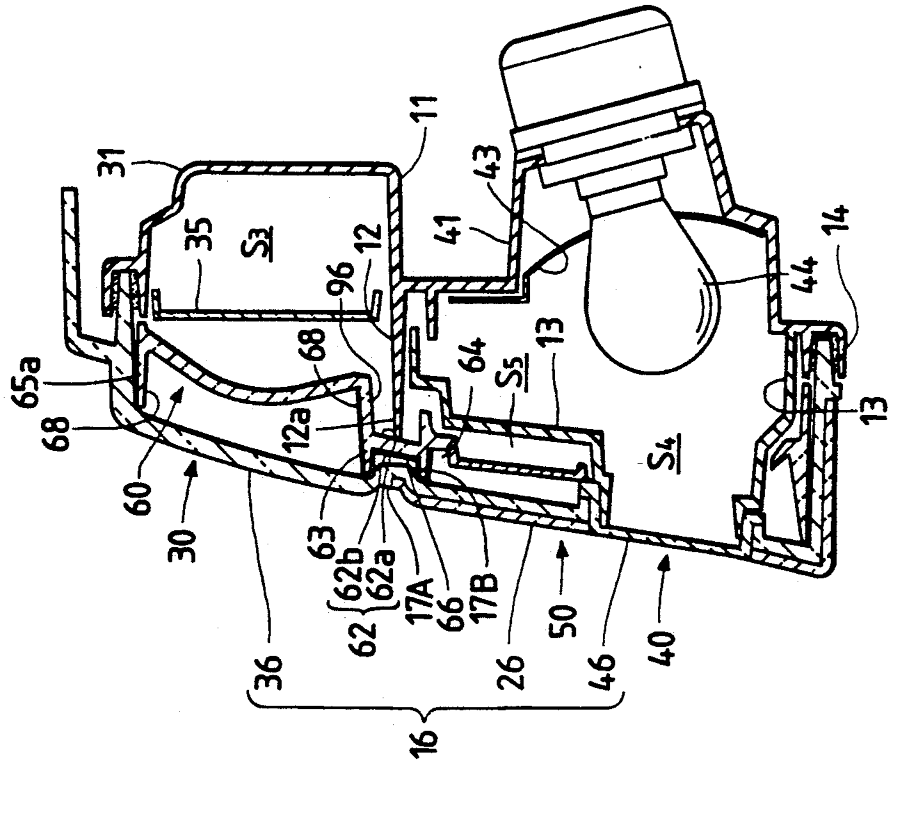
FIG. 4 is a vertical sectional view taken along line IV—IV in FIG. 1.
Figure 7:
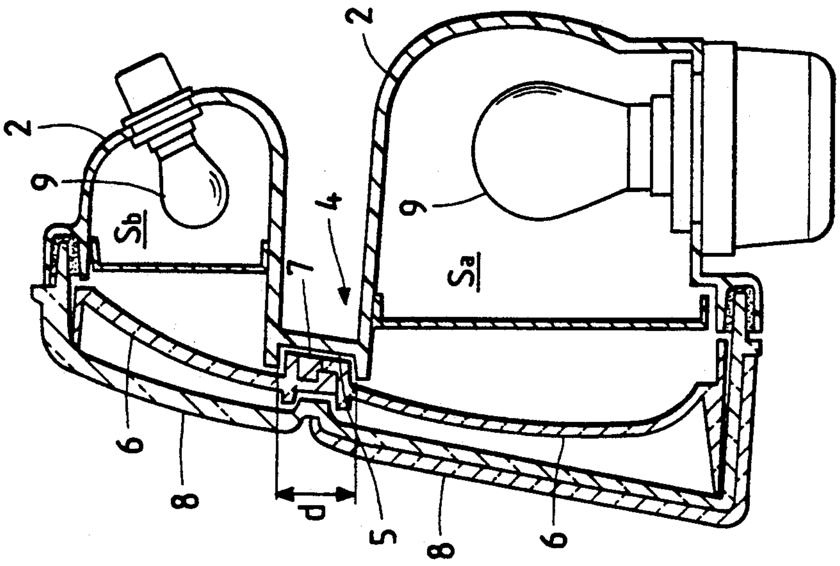
FIG. 7 PRIOR ART
FIG. 7 is a vertical sectional view showing a prior art vehicular lamp.

FIGS. 1 through 5 show a first embodiment of the present invention. More specifically, FIG. 1 is a front view of a rear combination lamp in which a tail and stop lamp and a turn signal lamp are provided as one unit; FIGS. 2 and 3 are horizontal sectional views taken along lines II—II and III—III in FIG. 1, respectively; and FIGS. 4 and 5 are vertical sectional views taken along lines IV—IV and V—V in FIG. 1, respectively.

In these figures, reference numeral 10 designates a rear combination lamp which is horizontally elongated. The rear combination lamp 10 includes a lower lamp, namely, a tail and stop lamp 20 and an upper lamp, namely, a turn signal lamp 30, which are formed as one unit. A backup lamp 40 and a reflex reflector 50 are incorporated in the tail and stop lamp 20.

In FIGS. 4 and 5, reference numeral 11 designates a lamp body of the rear combination lamp 10, and a shade 12 extends horizontally from the lamp body 11. A lamp chamber $S_2$ for the tail and stop lamp 20 is provided below the horizontal shade 12, and a lamp chamber $S_3$ for the turn signal lamp 30 above it. A rectangular-frame-shaped shade 13 is arranged to define the lamp chamber $S_4$. The lamp chamber $S_4$ for the backup lamp 40 (see FIGS. 2 and 4) is formed approximately at the central region (in the horizontal direction) of the lamp chamber $S_2$. The part of the lamp body 11 above the horizontal shade 12 is a lamp body part 31 for the turn signal lamp 30, and the part below the horizontal shade 12 is a lamp body part 21 for the tail and stop lamp 20. The part of the lamp body part 21 which confronts the lamp chamber $S_4$ is a lamp body part 41 for the backup lamp 40. The rectangular-frame-shaped shade 13 also defines a set-back chamber $S_5$ in the upper front portion of the space defined by the lamp body part 41. The reflex reflector 50 is provided in the set-back chamber $S_5$.

Reference numerals 23, 33 and 43 designate reflectors formed on the inner surfaces of the respective lamp body parts, and reference numerals 24, 34 and 44 denote light sources, namely, light bulbs installed in the lamp chambers $S_2$, $S_3$ and $S_4$, respectively. First inner lenses 25 and 35 having prism steps are arranged in front of the bulbs 24 and 34 in the lamp chambers $S_2$ and $S_3$, respectively so as to provide a luminous intensity distribution as required. A second inner lens 60 is laid over both of the lamp chambers $S_2$ and $S_3$.

The inner lens 60 has an engaging part 62 H-shaped in section which is engaged with (or attached to) the front end part 12*a* of the horizontal shade 12. More specifically, the engaging part 62 includes a rear engaging part 62*a* and a front engaging part 62*b*, and the rear engaging part 62*a* is engaged with the front end part 12*a* of the horizontal shade 12.

The lamp body 11 has a seal groove 14 along its periphery. An outer lens 16 (26, 36 and 46) is fixed to the periphery of the lamp body 11 with its leg engaged with the seal groove 14.

The outer lens 16, as shown in FIG. 4, includes a red lens 26, an amber lens 36, and a white lens 46 as one unit. The red lens 26 is for the tail and stop lamp 20, the amber lens 36 for the turn signal lamp 30, and the white lens 46 for the backup lamp 40. The amber lens body having such a size as to be engaged with the periphery of the lamp body 11 and the red lens body for the tail and stop lamp 20 are formed by bicolor molding to become an integral unit, and the transparent backup lens 46 is joined to the resultant integral lens unit, e.g., by welding. A front-side recess strip 17A and a backside protrusion strip 17B are formed extending horizontally along the boundary between the tail and stop lamp lens 26 and the turn signal lamp lens 36 of the outer lens 16, so that the light emitting region of the tail and stop lamp 20 and that of the turn signal lamp 30 appear clearly segregated from each other. The back-side protrusion strip 17B of the outer lens 16 is engaged with (or attached to) the front engaging part 62*b* of the second inner lens 60, so that the outer lens 16, the inner lens 60, and the horizontal shade 12 extending from the lamp body 11 are positioned relative to one another, and the vehicular lamp is strengthened structurally. In FIG. 3, reference numeral 39 designates a stud bolt for fixedly securing the lamp to a vehicle body.

A light shielding layer 66 is formed on the surface of the front engaging part 62*b* of the second inner lens 60, for instance, by coating, hot stamping or by sticking a plate, so that light beams traveling from the lamp chambers $S_2$ and $S_3$ to the light shielding layer 66 is blocked; that is, the light beams advancing from the lamp chambers $S_2$ and $S_3$ towards the outer lens 16 through the inner lens 60 are prevented from being mixed with each other. In other words, the light shielding layer 66 provides a horizontally extending belt-shaped non-light-emissive region between the light emission region of the tail and stop lamp 20 and that of the turn signal lamp 30 of the outer lens 16, so that, when the tail and stop lamp 20 or the turn signal lamp 30 is turned on, their boundary appears clearly. Compared with the case where the front surface of the outer lens is flat (i.e., no recess is formed therein), the front-side recess strip 17A of the outer lens 16 extremely reduces the quantity of light introduced to that region, contributing to the clear separation of the light emission regions of the tail and stop lamp 20 and the turn signal lamp 30.

Reference numeral 68 designates silver coatings formed on horizontal extensions 65*a* and 65*b* provided as the top and bottom side walls of the second inner lens 60, as well as on the surfaces of the respective horizontal extensions opposite to the light-shielding-layer (66) forming surface. Light incident on the silver coatings 68 is reflected thereby toward the light emission region of the outer lens 16 to enhance its emission quantity.

Figure 6:
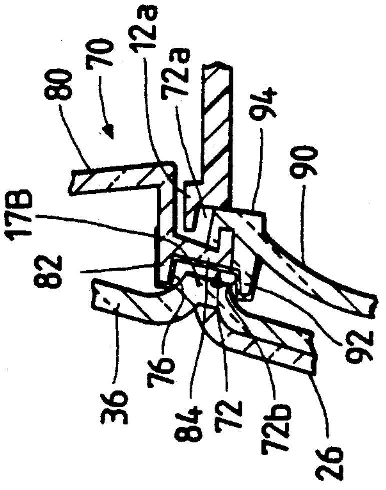
FIG. 6 is a vertical sectional view showing essential parts of a rear combination lamp according to a second embodiment of the invention.

FIG. 6 is a sectional view showing essential parts of second embodiment of the invention. This embodiment is different from the above-described first embodiment in that two inner lenses are welded together into one inner lens. Reference numeral 80 designates a turn signal lamp inner lens; and 90, a tail and stop lamp inner lens. The two lenses 80 and 90 are welded together into one inner lens 70. More specifically, the inner lens 80 has a horizontal frame-shaped part 82 along its lower edge, and a protrusion 84 substantially L-shaped in section extends downward from the middle of the horizontal frame-shaped part 82. The other inner lens 90 also has a horizontal frame-shaped part 92 along its upper edge, and an engaging recess 94 substantially bracket-shaped in section extends upward from the horizontal frame-shaped part 92. The protrusion 84 and the engaging recess 94 are welded together, thus providing an engaging part 72 which is substantially H-shaped in section. The engaging part 72 has a rear engaging recess 72*a* with which the horizontal shade's front end part 12*a* is engaged, and a front engaging recess 72*b* with which the back-side protrusion strip 17B of the outer lens is engaged. Further, reference numeral 76 designates a light shielding layer formed on the surface of the front engaging recess 72*b* of the inner lens 70.

In the above-described first and second embodiments, the light shielding layers 66 and 76 are each formed in the front engaging part forming region of the inner lens; however, the invention is not limited thereto. That is, the light shielding layer may be formed on the back side including inside surfaces 96 of the engaging part 62 (see FIGS. 4 and 5), or both sides of the second inner lens 60. Further, it is apparent that the present invention can also be applied to such a case that a vertical shade is provided to separate adjacent lamp chambers arranged in the horizontal direction.

As was described above, in the vehicular lamp according to the invention, the light shielding layer formed in the region of the inner lens where the recess strip is formed prevents light beams from the respective lamp chambers from passing through the region to advance forward, thus providing the non-light-emissive region between the outer lens light emission regions corresponding to the respective lamp chambers adjacent to each other. Hence, adjacent lamp chambers can be defined with only one shade without separating those chambers apart from each other. This construction permits an increase in the volumes of the lamp chambers as much, and prevents them from being deformed by heat generated by a bulb. Furthermore, for the same reason of the relaxed requirement for heat resistance, the degree of freedom in the selection of synthetic resin material for the lamp body is increased. Thus, the invention can provide an inexpensive vehicular lamp having high mechanical strength.

What is claimed is:

1. A vehicular lamp comprising:

means forming a plurality or lamp chambers in which respective light bulbs are installed, said means forming said lamp chamber including a lamp body defining a back side of the plurality of lamp chambers, and means shade extending forward from the lamp body between adjacent ones of the plurality of lamp chambers and having a plate form;

an inner lens provided so as to extend through the plurality of lamp chambers, the inner lens having an intermediate part including, on its back side, a first elongated recess portion extending substantially lengthwise of said lamps and being attached to the front part of the shade means;

an outer lens provided in front of the inner lens and being attached to the intermediate part of the inner lens; and a light shielding layer formed on a front surface and/or a rear surface of said intermediate part.

2. A vehicular lamp according to claim 1, wherein the light shielding layer is formed on inside surfaces of said intermediate part including its side surfaces.

3. A vehicular lamp according to claim 1, wherein the intermediate part further includes extensions extending forward from end portions of the first recess portion so that the intermediate part assumes a generally H shape in section, and wherein the light shielding layer is further formed on inside surfaces of the extensions.

4. A vehicular lamp according to claim 3, wherein outside surfaces of the generally H-shaped intermediate part are covered with a silver coating.

5. A vehicular lamp according to claim 3, wherein the outer lens has, on its back side, a protrusion strip extending substantially lengthwise of said lamp and being attached to a front side of the recess portion of the generally H-shaped intermediate part of the inner lens.

6. A vehicular lamp according to claim 5, wherein the outer lens further has a horizontal recess opposite the protrusion strip.

7. A vehicular lamp according to claim 1, wherein the outer lens includes a plurality of lenses respectively corresponding to the plurality of light chambers, and adjacent ones of the plurality of outer lenses have different colors.

8. A vehicular lamp according to claim 1, wherein the inner lens includes two lenses welded together at the intermediate part.

9. A vehicular lamp according to claim 1, wherein the light shielding layer is formed by painting.

10. A vehicular lamp according to claim 1, wherein the light shielding layer is formed by hot stamping.

11. A vehicular lamp according to claim 1, wherein the light shielding layer is formed by a plate.

* * * * *